US012736691B2

(12) United States Patent
Maruta et al.

(10) Patent No.: US 12,736,691 B2
(45) Date of Patent: Sep. 15, 2026

(54) X-RAY IMAGING SYSTEM, X-RAY IMAGING METHOD, AND X-RAY IMAGING CONTROL APPARATUS

(71) Applicant: Konica Minolta, Inc., Tokyo (JP)

(72) Inventors: Yuuichi Maruta, Hino (JP); Koutarou Kanamori, Hachioji (JP); Nobuyuki Miyake, Yokohama (JP); Ryohei Ito, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 160 days.

(21) Appl. No.: 18/626,786

(22) Filed: Apr. 4, 2024

(65) Prior Publication Data

US 2024/0345269 A1 Oct. 17, 2024

(30) Foreign Application Priority Data

Apr. 14, 2023 (JP) ................................ 2023-066549

(51) Int. Cl.
*G01T 1/24* (2006.01)
*G01T 7/00* (2006.01)

(52) U.S. Cl.
CPC .............. *G01T 1/244* (2013.01); *G01T 1/247* (2013.01); *G01T 7/005* (2013.01)

(58) Field of Classification Search
CPC .......... G01T 1/244; G01T 1/247; G01T 7/005
See application file for complete search history.

(56) References Cited

U.S. PATENT DOCUMENTS

2011/0013220 A1* 1/2011 Sabol ..................... G16H 40/20 709/224
2012/0189175 A1* 7/2012 Highnam ............. G06T 7/0012 382/128
2014/0119500 A1* 5/2014 Akahori ................ A61B 6/584 378/17
2014/0211922 A1* 7/2014 Kuwabara ............... A61B 6/56 378/97
2021/0153836 A1* 5/2021 Haase .................... A61B 6/586
2021/0259649 A1* 8/2021 Milioni De Carvalho ................. G06T 7/337
2021/0401393 A1* 12/2021 Kawanishi ........... A61B 6/4488
2022/0225957 A1* 7/2022 Kelly ...................... A61B 6/54

FOREIGN PATENT DOCUMENTS

JP 2022011814 A 1/2022

* cited by examiner

*Primary Examiner* — Hugh Maupin
(74) *Attorney, Agent, or Firm* — CANTOR COLBURN LLP

(57) ABSTRACT

Disclosed is an X-ray imaging system capable of performing X-ray imaging by dual-energy X-ray absorptiometry and general imaging, the X-ray imaging system including: an X-ray emitter capable of individually emitting a plurality of X-rays having different energies; a portable X-ray detector that captures an X-ray image based on an X-ray emitted by the X-ray emitter; and a hardware processor that provides, under a predetermined condition, a first notification related to capturing of a calibration image by the X-ray detector. The hardware processor provides the first notification each time X-ray imaging by the dual-energy X-ray absorptiometry is performed or when capturing of the calibration image is determined to be necessary.

19 Claims, 8 Drawing Sheets

3
31 CONTROLLER
32 COMMUNICATION SECTION
33 STORAGE SECTION
34 DISPLAY PART
35 OPERATION PART

1
HB
HS
2
high
$I_H$
$\mu_{BH}$
$\mu_{SH}$
low
$I_L$
$\mu_{BL}$
$\mu_{SL}$
$t_B$
$t_S$ START
S31
DXA IMAGING?
NO
YES
S32
DETERMINE SID HAS NOT CHANGED?
NO
YES
S33
DETERMINE FPD HAS NOT BEEN ATTACHED OR DETACHED?
NO
YES
S34
FIRST NOTIFICATION
S35
IS SUBJECT PLACED?
NO
YES
S36
SECOND NOTIFICATION
S37
DXA IMAGING
S38
CALCULATION
S39
PERFORM CALIBRATION
S310
RECALCULATION
S311
DXA IMAGING
S312
CALCULATION
END

X-RAY IMAGING SYSTEM, X-RAY IMAGING METHOD, AND X-RAY IMAGING CONTROL APPARATUS

CROSS REFERENCE TO RELATED APPLICATIONS

The present invention claims priority under 35 U.S.C. § 119 to Japanese Application No. 2023-066549, filed on Apr. 14, 2023, the entire contents of which being incorporated herein by reference.

BACKGROUND OF THE INVENTION

Technical Field

The present invention relates to an X-ray imaging system, an X-ray imaging method, and an X-ray imaging control apparatus.

Description of Related Art

Traditionally, dual-energy X-ray absorptiometry (DXA; Dual-energy X-ray Absorptiometry. Hereinafter, also referred to as a DXA method). As described in Japanese Unexamined Patent Publication No. 2022-11814, image imaging by the DXA method requires an image (calibration image) captured without a subject and an image captured with a subject while maintaining the same positional relationship between a radiation source and a radiation detector.

Bone density measurement requires very high accuracy because it measures changes in bone mass over time. In bone density measurement, it is also necessary that the same result can be obtained even when the same patient is imaged many times (reproducibility).

Therefore, in the image imaging apparatus using the DXA method, the arrangement of the radiation source and the radiation detector is mechanically fixed to suppress the variation in the positional relationship.

Therefore, an image imaging apparatus using the DXA method is used as a dedicated apparatus for bone density measurement or the like, and general imaging such as chest X-ray imaging and image imaging using the DXA method are performed by different apparatuses.

In recent years, a cassette-type radiation detector (flat panel detector (FPD)) has been widely used. Image imaging by the DXA method using a flat panel display (hereinafter referred to as FPD) has been proposed. Therefore, general imaging and imaging by the DXA method can be performed using the same imaging apparatus by replacing the cassette-type FPD.

SUMMARY OF THE INVENTION

However, usually, since a tube is moved in general imaging, a positional relationship between the radiation source and the radiation detector is changed. In addition, since a cassette-type FPD is used, a positional relationship between the radiation source and the radiation detector is changed by loading and unloading of the FPD with respect to the imaging stand.

Therefore, when the positional relationship between the radiation source and the radiation detector which is initially set at the time of the DXA imaging is changed, it is difficult to return to the positional relationship between the radiation source and the radiation detector again in units of mm.

Therefore, it is necessary to take the calibration image again as necessary, but it is difficult for the technician to accurately grasp the timing.

As a result, there is a problem in that re-imaging occurs due to the calibration being forgotten, or an accurate bone density cannot be calculated.

Therefore, an object of the present invention is to suitably perform calibration in an X-ray imaging system capable of performing X-ray imaging by dual-energy X-ray absorptiometry and general imaging.

To achieve at least one of the abovementioned objects, according to an aspect of the present invention, X Radiation imaging system reflecting one aspect of the present invention is an X-ray imaging system capable of performing X-ray imaging by dual-energy X-ray absorptiometry and general imaging, the X-ray imaging system comprising: an X-ray emitter capable of individually emitting a plurality of X-rays having different energies; a portable X-ray detector that captures an X-ray image based on an X-ray emitted by the X-ray emitter; and a hardware processor that provides, under a predetermined condition, a first notification related to capturing of a calibration image by the X-ray detector, wherein the hardware processor provides the first notification each time X-ray imaging by the dual-energy X-ray absorptiometry is performed or when capturing of the calibration image is determined to be necessary.

To achieve at least one of the abovementioned objects, according to an aspect of the present invention, X-ray imaging control apparatus reflecting one aspect of the present invention is an X-ray imaging control apparatus in an X-ray imaging system that performs X-ray imaging by dual-energy X-ray absorptiometry and general imaging by using an X-ray emitter capable of individually emitting a plurality of X-rays having different energies and a portable X-ray detector that captures an X-ray image based on an X-ray emitted by the X-ray emitter, the X-ray imaging control apparatus comprising a hardware processor that provides a first notification related to capturing of a calibration image by the X-ray detector under a predetermined condition, wherein the hardware processor provides the first notification each time the X-ray imaging by the dual-energy X-ray absorptiometry is performed, or when capturing of the calibration image is determined to be necessary.

To achieve at least one of the abovementioned objects, according to an aspect of the present invention, X-ray imaging method reflecting one aspect of the present invention is an X-ray imaging method using an X-ray imaging system capable of performing X-ray imaging by dual-energy X-ray absorptiometry and general imaging by an X-ray emitter capable of individually emitting a plurality of X-rays having different energies and a portable X-ray detector that captures an X-ray image based on an X-ray emitted by the X-ray emitter, the X-ray imaging method comprising providing, under a predetermined condition, a first notification related to capturing of a calibration image by the X-ray detector, wherein the first notification is provided each time X-ray imaging by the dual-energy X-ray absorptiometry is performed or when capturing of the calibration image is determined to be necessary.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

The radiation imaging system of the present embodiment is a general imaging apparatus to which a bone density measurement function by a dual-energy X-ray absorptiometry (DXA method; Dual-energy X-ray Absorptiometry) is added. Therefore, the radiation imaging system of the present embodiment can perform not only bone density inspection (X-ray imaging) by the dual-energy X-ray absorptiometry but also general imaging.

Here, the general imaging is imaging for obtaining a two dimensional radiation image for diagnosis by irradiation with radiation, and the number of two dimensional radiation images obtained by one imaging may be one or more, that is, includes both still image imaging and moving image imaging (dynamic imaging). Examples of the general imaging include chest X-ray still imaging, chest X-ray dynamic imaging, tomosynthesis, DES, and long-length imaging. In the bone mineral density examination by the DXA method, there is a system capable of obtaining a two dimensional radiation image not for diagnosis but for positioning of a subject in a series of examinations, but this does not correspond to the general imaging. This is because the general imaging here refers to two dimensional radiation imaging that can be used alone for diagnosis.

Figure 1:
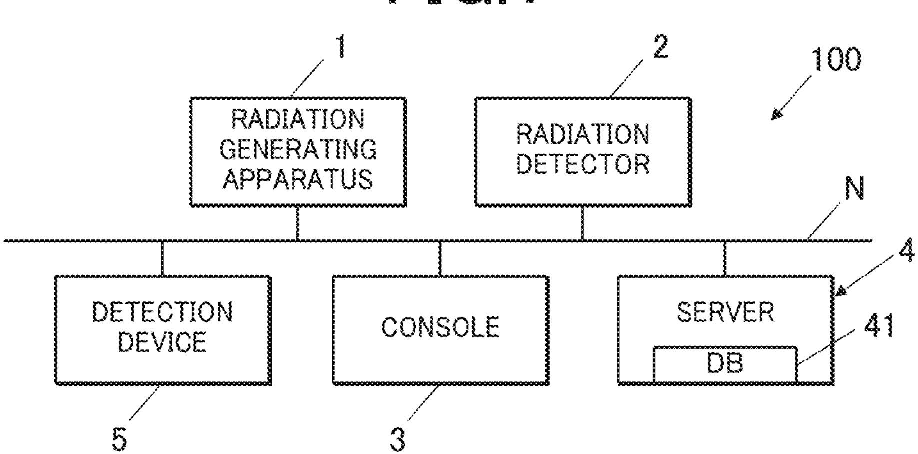
FIG. 1 is a block diagram showing a radiation imaging system according to an embodiment of the present invention.

First, a schematic configuration of a radiation imaging system 100 according to the present embodiment is described. FIG. 1 is a block diagram illustrating a radiation imaging system 100.

As illustrated in FIG. 1, the radiation imaging system 100 according to the present embodiment includes a radiation generating apparatus 1, a radiation detector 2, a console 3, and a server 4.

These are communicable with each other via a communication network N.

Note that the radiation imaging system 100 (X-ray imaging system 100) may be connected to a hospital information system (HIS), a radiology information system (RIS), a picture archiving and communication system (PACS), an image analysis apparatus, and the like (not shown).

Figure 2:
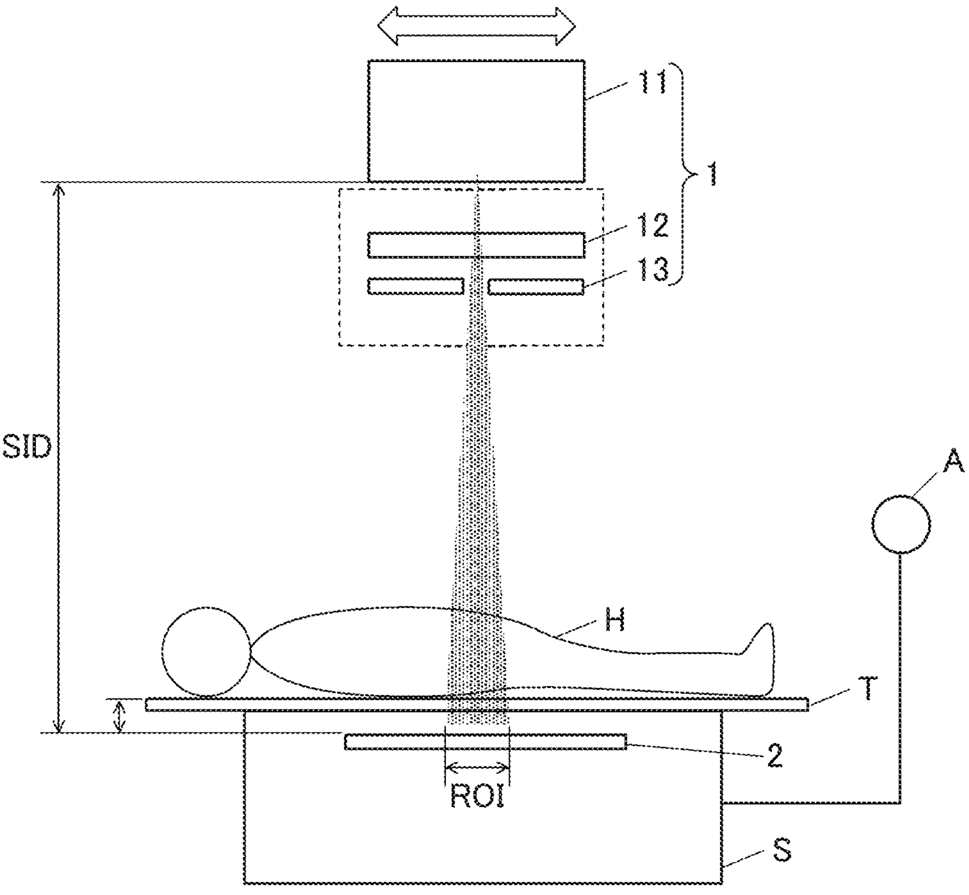
FIG. 2 is a schematic diagram illustrating an example of the configuration of a radiation generating apparatus and a radiation detector.

As shown in FIG. 2, the radiation generating apparatus 1 (X-ray emitter) includes a generator, a radiation source 11, a K-edge filter 12, a slit 13, and the like. These are opposed to the subject H and are arranged in the order of the slit 13, the K edge filter 12, and the radiation source 11 from the side of the subject H.

The generator applies a voltage corresponding to preset irradiation conditions (tube voltage, tube current, irradiation time, tube current-time product (mAs value), and the like). When a voltage is applied from the generator, the radiation source 11 generates radiation (for example, X-rays) of a dose corresponding to a tube current.

The radiation generating apparatus 1 is provided with a moving mechanism and can be fixed at a position away from the radiation detector 2 by a predetermined distance. The movement mechanism is provided with a sensor, and the sensor can measure a movement distance.

The radiation source 11 (tube) generates radiation (for example, X-rays) in a mode corresponding to a radiation image to be captured.

The K-edge filter 12 is a filter for absorbing X-rays in a middle range of an X-ray spectrum and separating energy of high-energy X-rays and energy of low-energy X-rays. That is, the K edge filter 12 functions as an energy separation unit. For example, Gd (gadolinium) or Cu (copper) is used for the K-edge filter 12.

The slit 13 is a mechanism for narrowing an X-ray irradiation range in order to reduce a scattered-ray component, which affects accuracy of bone density, as much as possible. Note that since bone density changes over time, extremely high precision is necessary, so it is necessary to reduce the scattered-ray component as much as possible. For example, a collimator provided in the radiation source 11 (tube) may be used, or a slit mechanism may be externally attached to the radiation source 11.

Note that the radiation generating apparatus 1 may be installed in an imaging room, or may be incorporated in a movable body called a medical cart together with the console 3 and the like.

Further, the K-edge filter 12 and the slit 13 may be externally attached to the radiation source 11. For example, the radiation source 11 may be provided with a loading unit for the K-edge filter 12 and the slit 13.

An X-ray detector or a flat panel detector (FPD) (not shown) includes a radiation detection element that receives radiation and generates charges corresponding to the dose of the radiation. The radiation detector 2 includes a substrate on which pixels including switch elements to store and release electric charge are two dimensionally (in a matrix) arranged. The radiation detector 2 includes a scanning circuit that turns on and off each switch element and a reading circuit that reads, as a signal value, the amount of charge emitted from each pixel. The radiation detector 2 includes a controller that generates a radiation image from the plurality of signal values read by the reading circuit, an output section that outputs data and the like of the generated radiation image to the outside, and the like.

Next, the radiation detector 2 generates a radiation image corresponding to the emitted radiation in synchronization with the timing at which the radiation is emitted from the radiation generating apparatus 1. The irradiation image generation synchronization timing for synchronizing the timing at which the radiation is emitted from the radiation generating apparatus 1 with the timing at which the radiation image is generated is generated by the radiation generating apparatus 1 and sent to the radiation detector 2 via the communication network N described later. The radiation detector 2 generates a radiation image on the basis of the irradiation image generation synchronization timing. Alternatively, the irradiation image generation synchronization timing may be generated by the radiation detector 2 and transmitted to the radiation generating apparatus 1 via the communication network N, and the radiation generating apparatus 1 may emit radiation based on the irradiation image generation synchronization timing. Note that the irradiation image generation synchronization timing may be transmitted using a cable for irradiation image generation synchronization timing separately from the communication network N. In addition, the communication network N and the irradiation image generation synchronization timing cable may be integrated into one cable (communication network/irradiation image generation synchronization timing common cable).

Note that the radiation detector 2 may incorporate a scintillator or the like, convert the applied radiation into light having another wavelength such as visible light by the scintillator, and generate charges corresponding to the converted light (a so-called indirect type). Furthermore, the radiation detector 2 may generate charges directly from radiation without involving a scintillator or the like (a so-called direct type).

In addition, the radiation detector 2 is a portable type (cassette type) and is loaded on an imaging stand S as illustrated in FIG. 2. The imaging stand S is provided with a sensor and can detect attachment and detachment of the radiation detector 2. When the sensor detects attachment or detachment of the radiation detector 2, information on the attachment or detachment is transmitted to the console 3 (controller 31) via the communication network N.

Furthermore, in the present embodiment, the radiation detector 2 needs to be compatible with imaging by the DXA method (hereinafter, DXA imaging). For example, in the case of performing imaging by moving the tube while narrowing the X-rays with a slit to be described later (referred to as slot imaging or the like), the X-rays are subjected to pulse irradiation. Therefore, it is necessary that the FPD can perform control corresponding to the pulse irradiation (e.g., control to generate a radiation image in synchronization with the irradiation timing of the pulse irradiation).

The distance between the radiation source 11 and the radiation detector 2 illustrated in FIG. 2 is referred to as a source image receptor distance (SID). To be precise, Source is the focal point of the radiation source 11 that is a tube bulb, and Image receptor is the image receiving surface of the radiation detector 2 (FPD), so that SID is the focus-FPD distance.

The SID can be measured using movement information of the movement mechanism provided in the radiation generating apparatus 1.

The console 3 (X-ray imaging controller) forms an image processing apparatus or an electronic device, and includes a PC, a dedicated device, or the like.

Furthermore, the console 3 can set various imaging conditions (a tube voltage or a tube current, an irradiation time, a tube current-time product (mAs value), a frame rate, the physique of the subject H, the presence or absence of a grid, and the like) in the imaging device or the like on the basis of imaging order information acquired from another system (the HIS, the RIS, or the like) or an operation by the user.

Figures 3, 4, 5:
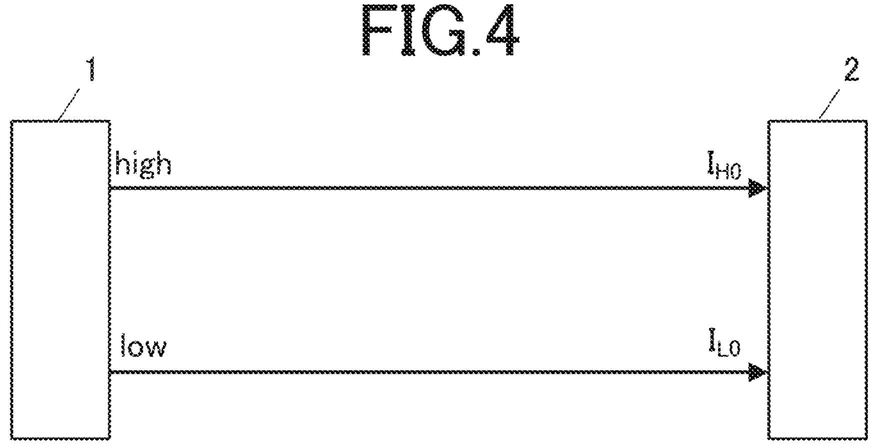
FIG. 3 is a block diagram illustrating a console included in the radiation imaging system.
FIG. 4 is an image diagram of imaging without a subject.
FIG. 5 is an image diagram of subject-present imaging.

As shown in FIG. 3, the console 3 according to the present embodiment includes a controller 31, a communication section 32, a storage section 33, a display part 34, and an operation part 35.

The units 31 to 35 are electrically connected to each other by a bus.

The controller 31 includes a central processing unit (CPU), a random access memory (RAM), and the like.

The CPU of the controller 31 reads various programs stored in the storage section 33, develops the programs in the RAM, executes various processes in accordance with the developed programs, and centrally controls the operation of each unit of the console 3.

The controller 31 functions as a hardware processor that performs a first notification related to capturing (calibration imaging) of a calibration image by the X-ray detector under a predetermined condition. As the hardware processor, the controller 31 provides the first notification each time X-ray imaging by dual-energy X-ray absorptiometry is performed or when it is determined that it is necessary to capture a calibration image. Furthermore, if a subject is present on the imaging stand at the time of capturing of the calibration image, the controller 31 as the hardware processor provides a second notification of this. The calibration image will be described later.

Furthermore, the controller 31 functions as a hardware processor that determines whether it is necessary to capture a calibration image.

In addition, the controller 31 functions as a hardware processor that determines whether or not a subject is present on the imaging stand.

Note that the controller 31 causes the display part 34, which is a notifier to be described later, to provide the first notification and the second notification.

The communication section 32 includes a communication module and the like.

The communication section 32 transmits and receives various signals and various data to and from other devices or the like connected via a communication network N (a local area network (LAN), a wide area network (WAN), the Internet, or the like).

The storage section 33 is formed with a nonvolatile semiconductor memory, a hard disk, or the like.

The storage section 33 stores various programs to be executed by the controller 31, parameters necessary for the execution of the programs, and the like.

The display part 34 includes a display device that displays an image, such as a liquid crystal display (LCD) or a cathode ray tube (CRT), a lamp (such as an LED) that emits light, a speaker that outputs sound, a vibrator that vibrates, and the like.

Note that the display part 34 functions as a notifier.

Furthermore, as illustrated in FIG. 2, a notifier A such as a warning lamp or a speaker may be provided on the imaging stand S.

The operation part 35 includes a keyboard including cursor keys, numeric input keys, various function keys, and the like, a pointing device such as a mouse, a touch panel stacked on a surface of a display device, and the like.

Then, the operation part 35 outputs a control signal corresponding to the operation performed by the user to the controller 31.

The controller 31 of the console 3 configured in such a manner has a function of executing calibration necessity determination processing as illustrated in FIG. 6 to FIG. 9, for example, triggered by loading of the radiation detector 2 on the imaging stand S.

The server 4 is constituted by a PC, a dedicated device, a virtual server on a cloud, or the like.

Further, the server 4 includes a database 41.

The database 41 stores information on an imaging method and individual information on the FPD.

Note that although the database 41 is provided in the server 4 independent of the console 3 and the like in the present embodiment, the database 41 may be provided in the console 3 or in another apparatus included in the radiation imaging system 100.

In a case where another system such as a PACS is connected to the radiation imaging system 100, it may be provided in another system.

The radiation imaging system 100 is further provided with a detection device 5 that detects whether or not the subject H exists on the subject table T. The detection device 5 is, for example, a camera, a gravity sensor, or a laser. When the detection device 5 is a camera, the subject table T is photographed by the camera. The controller 31 of the console 3 determines, using the captured image, whether the subject H exists. In a case where the detection device 5 is a gravity sensor, the gravity sensor is provided on the subject table T. By detecting the movement of the subject table T, it is determined whether the subject H exists on the subject table T. Furthermore, when the detection device 5 is a laser, the detection device 5 detects reflected light of laser light from the subject H. From the detection result of the reflected light, it is determined whether the subject H exists on the subject table T.

In the radiation imaging system 100 according to the present embodiment configured as described above, the radiation source of the radiation generating apparatus 1 and the radiation detector 2 are disposed to face each other with a gap therebetween. A radiation image of the subject H can be captured by irradiating the subject H disposed therebetween with radiation from the radiation source.

In a case where the radiation image is a still image (still image imaging; general imaging), irradiation of radiation and generation of a radiation image are performed only once per one imaging operation. In a case where the radiation image is a moving image (dynamic imaging; serial imaging), the emission of pulsed radiation and the generation of a frame image are repeated a plurality of times in a short time (for example, 15 times per second) for each imaging operation.

In imaging by the DXA method, scan imaging is performed by moving an irradiation range ROI (region of interest) narrowed by the slit 13 with respect to the subject H by linearly moving the radiation source 11 as indicated by an arrow shown in FIG. 2.

Here, the DXA method will be described with reference to FIG. 4 and FIG. 5.

The DXA method is a method in which radiation rays having two types of energy (high kV and low kV) are applied to a portion to be measured, and an intended physical quantity of the portion to be measured is calculated from the amount of measured radiation rays (a radiation image). For example, in the DXA method, a bone part and other soft tissues are distinguished from each other, and the thickness of the bone part is calculated and measured as a target physical amount. In the DXA method, calibration imaging (imaging without a subject) in a state in which the subject H is not placed on the imaging stand S and imaging with a subject in a state in which the subject H is placed on the imaging stand S are performed. In each of the imaging without a subject and the imaging with a subject, imaging using high-energy radiation and imaging using low-energy radiation are performed. An image captured in the calibration imaging is referred to as a calibration image.

FIG. 4 is an image diagram of imaging without a subject. To be specific, FIG. 4 is an image diagram in which image information $I_{H0}$ is detected by the radiation detector 2 in imaging using high-energy radioactive rays (high), and image information $I_{L0}$ is detected by the radiation detector 2 in imaging using low-energy radioactive rays (low).

FIG. 5 is an image diagram of subject-present imaging. Specifically, in the subject-present imaging shown in FIG. 5, the radiation passes through the subject H. The subject H includes a bone part HB and a soft tissue HS other than the bone part. FIG. 5 is an image diagram in which image information $I_H$ is detected in the radiation detector 2 in imaging using high-energy radiation (high), and image information $I_L$ is detected in the radiation detector 2 in imaging using low-energy radiation (low).

Note that the energy of radiation used in the imaging without a subject illustrated in FIG. 4 and the imaging with a subject illustrated in FIG. 5 is the same as radiation (high) in the case of high energy and radiation (low) in the case of low energy.

The linear absorption coefficients $\mu_{BH}$ of the bone HB in imaging using high-energy radiation (high), the linear absorption coefficients $\mu_{BL}$ of the bone HB in imaging using low-energy radiation (low), the linear absorption coefficients $\mu_{SH}$ of the soft tissue HS in imaging using high-energy radiation (high), and the linear absorption coefficients $\mu_{SL}$ of the soft tissue HS in imaging using low-energy radiation (low) are known.

Further, the thickness $t_B$ of the bone portion HB and the thickness $t_S$ of the soft tissue HS are unknown. By using the following expressions, it is possible to calculate the unknown thickness $t_B$ of the bone part HB and the thickness $t_S$ of the soft tissue HS.

Formula (1) is an expression representing the relationship between image information $I_{L0}$ and image information $I_L$.

$$I_L = I_{L0}\exp(-\mu_{BL}t_B - \mu_{SL}t_S) \tag{1}$$

Formula (2) is a formula representing the relationship between image information $I_{H0}$ and image information $I_H$.

$$I_H = I_{H0}\exp(-\mu_{BH}t_B - \mu_{SH}t_S) \tag{2}$$

Formula (3) is a formula in which Formula (1) and Formula (2) are combined and represented by a matrix.

$$-\begin{pmatrix} \ln\left(\frac{I_L}{I_{L0}}\right) \\ \ln\left(\frac{I_H}{I_{H0}}\right) \end{pmatrix} = \begin{pmatrix} \mu_{BL} & \mu_{SL} \\ \mu_{BH} & \mu_{SH} \end{pmatrix}\begin{pmatrix} t_B \\ t_S \end{pmatrix} \tag{3}$$

Formula (4) is a formula for calculating the thickness $t_B$ of the bone part HB and the thickness $t_S$ of the soft tissue HS by solving Formula (3).

$$-\begin{pmatrix} t_B \\ t_S \end{pmatrix} = \begin{pmatrix} \mu_{BL} & \mu_{SL} \\ \mu_{BH} & \mu_{SH} \end{pmatrix}^{-1} \begin{pmatrix} \ln\left(\frac{I_L}{I_{L0}}\right) \\ \ln\left(\frac{I_H}{I_{H0}}\right) \end{pmatrix} \quad (4)$$

In the DXA method, X-rays of two different types of energy, i.e., high energy and low energy, are irradiated, and the bone density is measured based on the difference in absorptivity between bone and soft tissue. Therefore, for example, in the forward path, scanning imaging is performed with the tube voltage of the radiation source 11 set to 70 kV and the K edge filter 12 set to Gd, there is a method in which in the return path, the tube voltage of the source 11 is set to 110 kV, the K edge filter 12 is set to Cu, and the reciprocal scanning imaging is performed.

The imaging method may be a method of performing unidirectional scan imaging while switching the tube voltage of the radiation source 11 and the K-edge filter 12 for each irradiation range ROI.

Further, the radiation source 11 performs pulse irradiation for each irradiation range ROI. This is because the influence of scattered radiation increases when the imaging range is exposed once, and the accuracy of the bone density is affected. Therefore, the influence of the scattered rays can be reduced by narrowing the irradiation range ROI using a slit and performing pulse irradiation for each irradiation range ROI.

The irradiation range ROI on the radiation detector 2 is determined by the width of the slit 13 and the SID.

<Calibration Necessity Determination Processing>

Next, the calibration necessity determination processing will be described with reference to the flowcharts of FIG. 6 to FIG. 9. The calibration necessity determination processing is processing for determining that calibration imaging is necessary in a case where imaging to be performed is DXA imaging.

Figure 6:
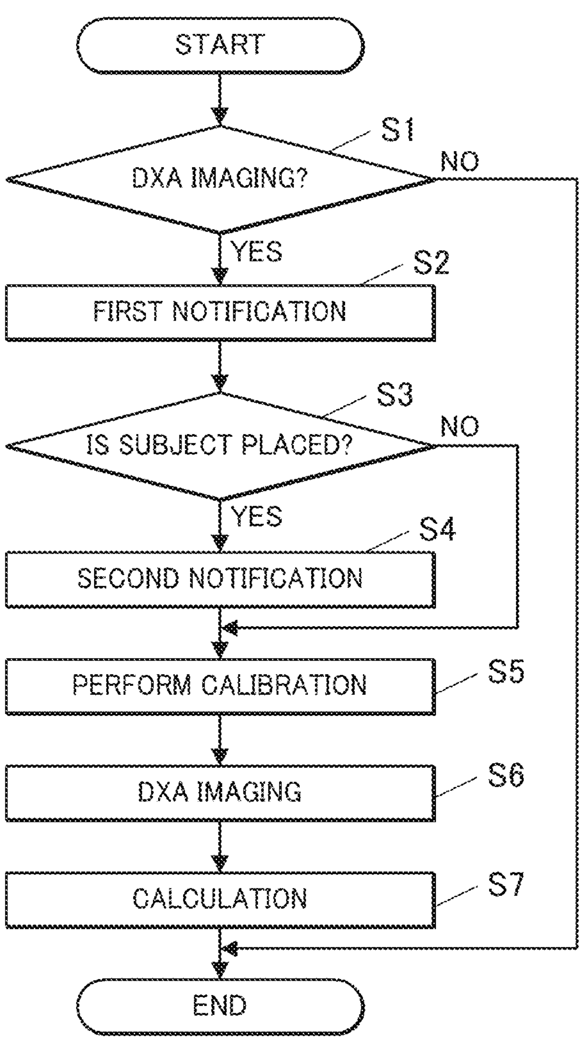
FIG. 6 is a flowchart illustrating calibration necessity determination processing.

The flowchart illustrated in FIG. 6 is an example of calibration necessity determination processing in which a calibration image is captured each time X-ray imaging by the DXA method is performed.

Figure 7:
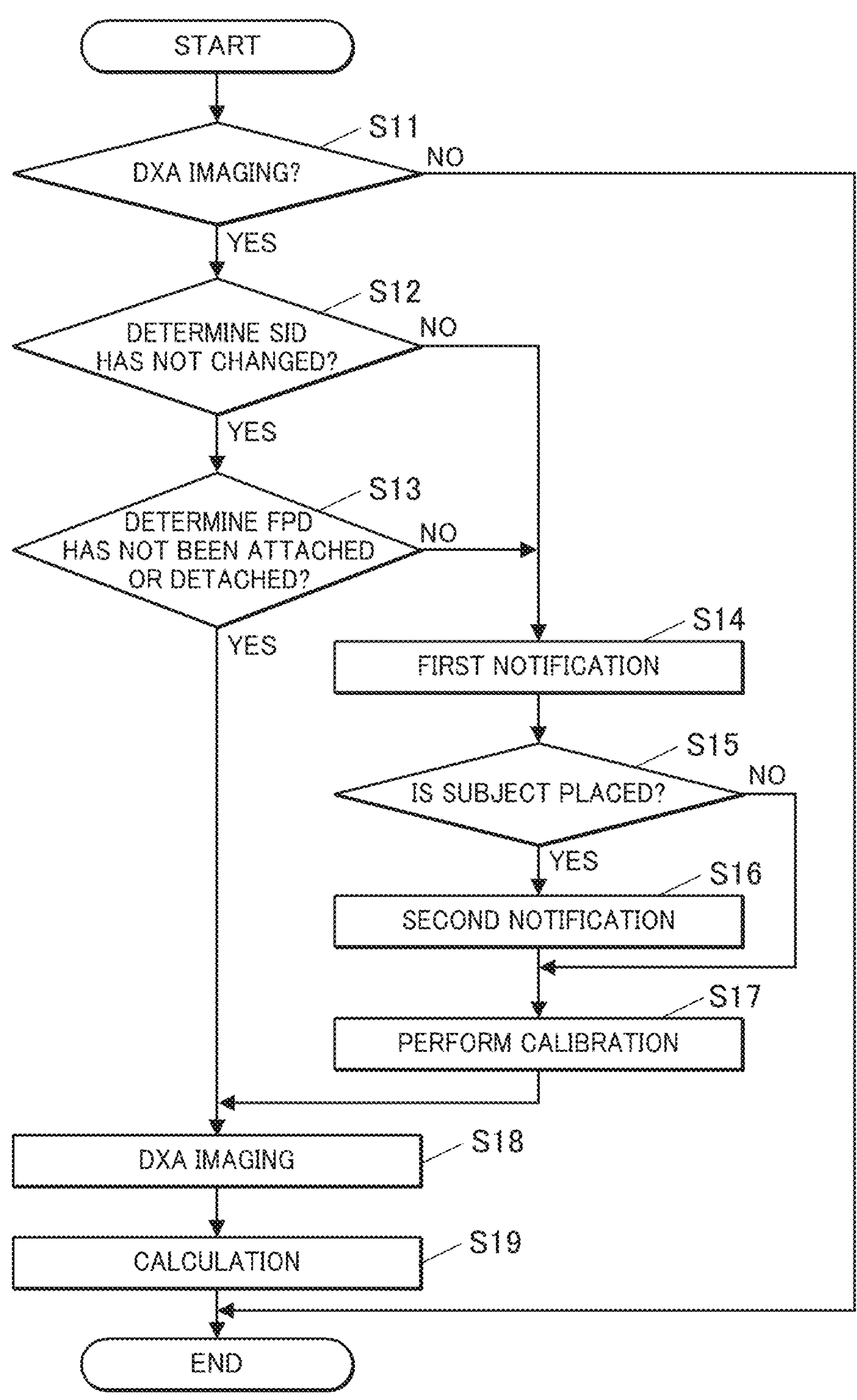
FIG. 7 is a flowchart illustrating calibration necessity determination processing.

The flowchart illustrated in FIG. 7 is an example of the calibration necessity determination processing for performing the capturing of the calibration image when it is determined that the capturing of the calibration image is necessary.

Figure 8:
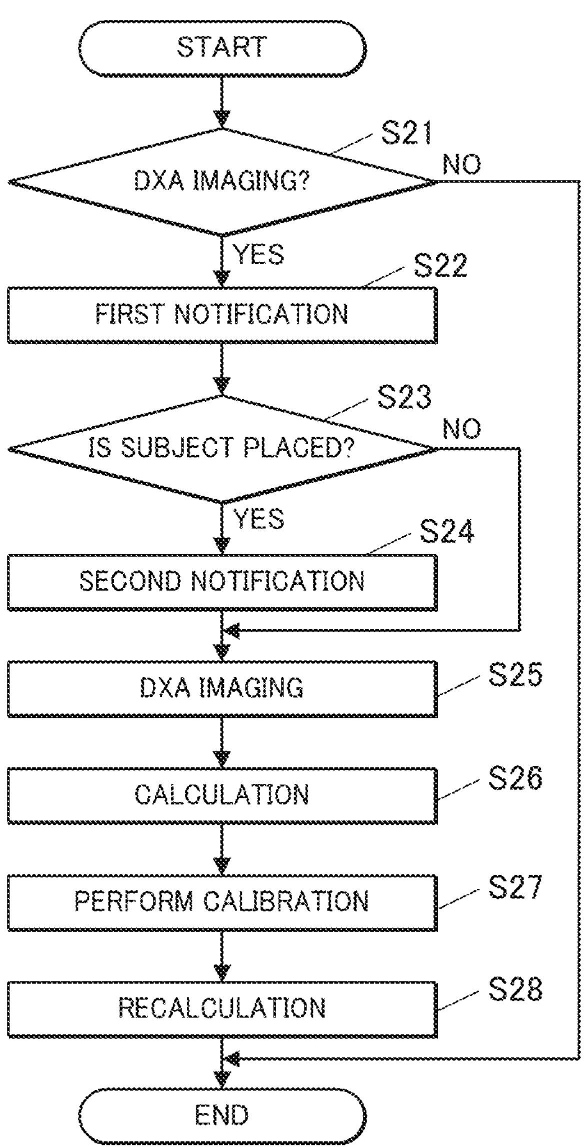
FIG. 8 is a flowchart illustrating calibration necessity determination processing.

The flowchart illustrated in FIG. 8 is an example of calibration necessity determination processing in which a calibration image is captured each time X-ray imaging by the DXA method is performed and the capturing of the calibration image is performed after the X-ray imaging by the DXA method.

Figure 9:
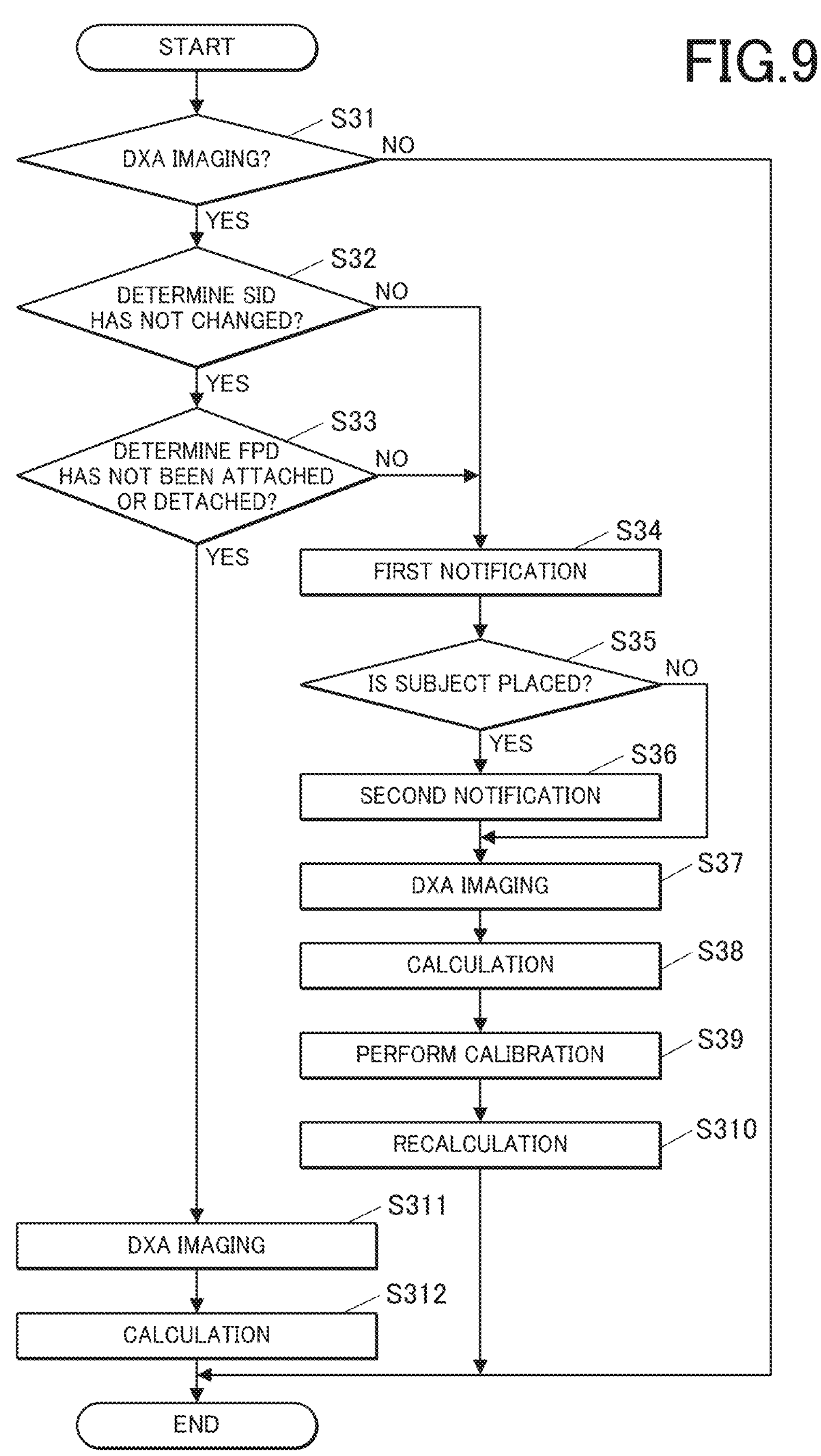
FIG. 9 is a flowchart illustrating calibration necessity determination processing.

The flowchart illustrated in FIG. 9 is a calibration necessity determination process of performing the capturing of the calibration image in a case where it is determined that the capturing of the calibration image is necessary and is an example in which the capturing of the calibration image is performed after the X-ray imaging by the DXA method.

The calibration necessity determination process will be described with reference to the flowchart of FIG. 6.

Triggered by the start of the examination by the user, the controller 31 determines, from the imaging order information acquired from the RIS or the like, whether the imaging to be performed is DXA imaging (step S1). In a case where the DXA imaging is performed (step S1; YES), the controller 31 advances the calibration necessity determination process to step S2. When the DXA imaging is not performed (step S1; NO), the controller 31 ends the calibration necessity determination processing.

Next, the controller 31 allows the display part 34 to provide a notification that calibration imaging is necessary (step S2; first notification step).

Next, the controller 31 determines whether the subject H is placed on the subject table T (step S3). When it is placed (step S3; YES), the controller 31 advances the calibration necessity determination processing to step S4. When it is not placed (step S3; NO), the controller 31 advances the calibration necessity determination processing to step S5.

Next, the controller 31 allows the display part 34 to provide a notification that the subject H needs to be brought into a state of not being placed on the subject table T in order to perform calibration imaging (step S4; second notification step).

Next, the controller 31 performs calibration imaging (step S5).

Next, the controller 31 executes DXA imaging (imaging with the subject) (step S6).

Next, the controller 31 calculates physical quantities using the radiation images captured in the step S5 and step S6 (step S7). Then, the controller 31 ends the calibration necessity determination process.

The calibration necessity determination processing will be described with reference to the flowchart of FIG. 7.

Triggered by the start of the examination by the user, the controller 31 determines, from the imaging order information acquired from the RIS or the like, whether the imaging to be performed is DXA imaging (step S11). In a case where the DXA imaging is performed (step S11; YES), the controller 31 advances the calibration necessity determination process to step S12. In a case where the DXA imaging is not performed (step S11; NO), the controller 31 ends the calibration necessity determination process.

Next, the controller 31 determines whether the SID has not changed since the last calibration imaging (step S12). When the controller 31 determines that the SID has not changed (step S12; YES), the controller 31 advances the calibration necessity determination processing to step S13. In a case where the SID is changed (step S12; NO), the controller 31 advances the calibration necessity determination process to step S14.

Next, the controller 31 determines whether the FPD has not been attached or detached since the previous calibration imaging (step S13). When the controller 31 determines that the FPD is not attached or detached (step S13; YES), the controller 31 advances the calibration necessity determination processing to step S18. When the FPD is attached or detached (step S13; NO), the controller 31 advances the calibration necessity determination processing to step S14.

Next, the controller 31 allows the display part 34 to provide a notification that calibration imaging is necessary (step S14; first notification step).

Next, the controller 31 determines whether the subject H is placed on the subject table T (step S15). When it is placed (step S15; YES), the controller 31 advances the calibration necessity determination processing to step S16. When it is not placed (step S15; NO), the controller 31 advances the calibration necessity determination processing to step S17.

Next, the controller 31 allows the display part 34 to provide a notification that the subject H needs to be brought into a state of not being placed on the subject table T in order to perform calibration imaging (step S16; second notification step).

Next, the controller 31 performs calibration imaging (step S17).

Next, the controller 31 executes DXA imaging (imaging with the subject) (step S18).

Next, the controller 31 calculates physical quantities using the radiation images captured in the previous calibration imaging or step S17 and step S18 (step S19). Then, the controller 31 ends the calibration necessity determination process.

In the above-described flow, it is determined whether or not the SID has changed since the previous calibration imaging, and whether or not the FPD has been attached or detached since the previous calibration imaging, but the present invention is not limited thereto. The information to be determined includes changes in various states in the period from the previous calibration imaging to the capturing of the subject image, which affect the positional relationship between the radiation source 11 and the radiation detector 2.

The calibration necessity determination process will be described with reference to the flowchart of FIG. 8.

Since steps S21 to S24 are the same as steps S1 to S4 of FIG. 6, description thereof will be omitted.

Next, the controller 31 executes DXA imaging (imaging with the subject) (step S25).

Next, the controller 31 associates the radiation image captured in step S25 with the temporary calibration image, and calculates temporary physical quantities (step S26).

Next, the controller 31 performs calibration imaging (step S27).

Next, the controller 31 calculates a physical quantity using the radiation image captured in step S25 and step S27 (step S28). Then, the controller 31 ends the calibration necessity determination process.

The calibration necessity determination process will be described with reference to the flowchart of FIG. 9.

Since steps S31 to S36 are the same as steps S11 to S16 of FIG. 7, description thereof will be omitted.

Next, the controller 31 executes DXA imaging (imaging with the subject) (step S37).

Next, the controller 31 associates the radiation image captured in step S37 with the temporary calibration image, and calculates temporary physical quantities (step S38).

Next, the controller 31 performs calibration imaging (step S39).

Next, the controller 31 calculates physical quantities using the radiation images captured in the step S37 and S39 (step S310). Then, the controller 31 ends the calibration necessity determination process.

If the controller 31 determines YES in step S31, S32, and S33, the controller 31 executes DXA imaging (imaging with a subject) (step S311).

Next, the controller 31 calculates physical quantities using the radiation images captured in the previous calibration imaging and step S311 (step S312). Then, the controller 31 ends the calibration necessity determination process.

Generally, as illustrated in FIG. 6 or 7, in a case where the calibration imaging is performed, the imaging with the subject is performed after the calibration imaging.

However, there are also cases where subject-present imaging is desired to be performed before calibration imaging. In this case, the bone density or the like cannot be calculated immediately after the imaging with the subject.

Therefore, in a case where the imaging with the subject is desired to be performed before the calibration imaging, as illustrated in FIG. 8 or 9, the image with the subject and the temporary calibration image may be calculated in association with each other after the imaging with the subject. In such a manner, a provisional calculation result can be obtained, it can be confirmed whether the imaging with the subject has been correctly performed before the calibration imaging, and a risk that the patient leaves although the imaging with the subject has not been correctly performed can be reduced. Then, later, calibration imaging is performed, the image is re-associated with an image with a subject, and calculation is performed, so that a normal calculation result can be obtained.

As the above-described temporary calibration image, a certain standard value, a calculated value calculated from the weight of the patient or the like, or a value of another examination can be used.

Note that although the controller 31 causes the display part 34 of the console 3 to provide the notification in the processing illustrated in FIG. 6 to FIG. 9 described above, it is desirable to cause the display part provided in the imaging room to provide the notification. In general, the console 3 is disposed in an operation room outside the imaging room. Examples of the display part provided in the imaging room include a display part attached to the radiation generating apparatus 1 and a display monitor connected to the communication network N and disposed in the imaging room. The display part attached to the radiation generating apparatus 1 includes, for example, a display part attached to the radiation source 11. It is desirable that the display monitor connected to the communication network N and arranged in the imaging room is arranged, for example, in a portion (the radiation source 11 or the like) of which the arrangement is changed by the operation of changing the SID or the subject table T (imaging stand).

Devised Example of Calibration Imaging

Next, a devised example of the calibration imaging will be described.

For example, the controller 31 can detect an abnormality in the settings of the radiation generating apparatus 1 (the radiation source 11, the K edge filter 12, and the slit 13) and the radiation detector 2 by confirming an abnormality in the X-ray profile during calibration imaging.

In the following description, the radiation profile will be described using, as an example, a profile of signal values detected on a certain straight line parallel to the sheet surface of the irradiation range ROI in FIG. 2. The horizontal axis of the radiation profile is a position on a certain straight line, and the vertical axis is a detected signal value.

Figure 10:
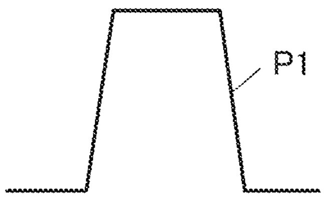
FIG. 10 is an example of a normal radiation profile.

FIG. 10 is an example of a normal radiological profile P1. Since the state in which the irradiation range ROI of the radiation detector 2 is uniformly irradiated with the radioactive rays from the radiation source 11 is a normal state, the maximum value of the signal value is constant in the radiation profile P1.

Figure 11:
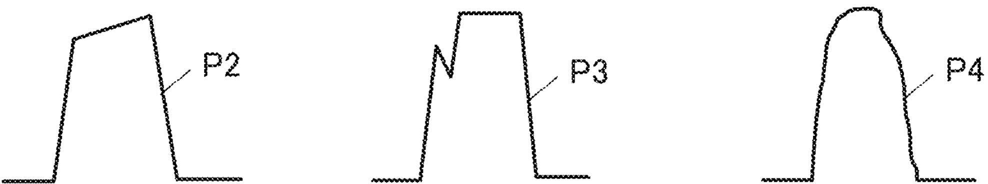
FIG. 11 is an example of abnormal radiation profiles.

On the other hand, FIG. 11 is an example of abnormal radiation profiles P2, P3, and P4. The maximum value of the signal value is not constant in the radiation profile P2, P4. In the radiation profile P2, the signal value gradually increases from the right side to the left side (or from the left side to the right side) of the sheet surface of the irradiation range ROI of the radiation detector 2 of FIG. 2. In the radiation profile P4, the signal values undulate. Furthermore, in the radiation profile P3, disturbance occurs in the signal value.

The abnormal radiation profiles P2, P3, and P4 as described above occur, for example, in a case where the radiation source 11, the K edge filter 12, and the slit 13 are not aligned on a radiation irradiation axis.

Furthermore, during calibration imaging, the controller 31 can detect the speed accuracy and dose variation of the radiation source 11 in scanning imaging and streak unevenness/gain unevenness of the radiation detector 2.

In the scan imaging, it is necessary that the radiation profiles detected for each irradiation range ROI have the same shape, and the radiation profiles overlap each other at a certain position. This is because the radiation profiles detected for each irradiation range ROI are combined.

Figure 12:
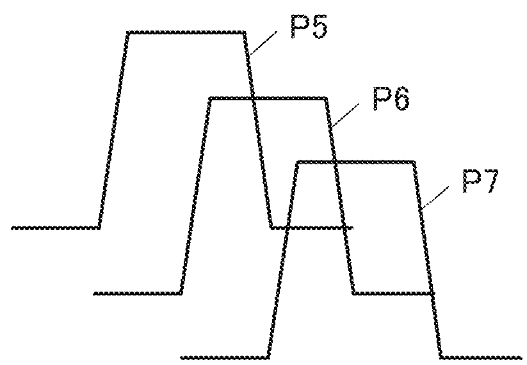
FIG. 12 is an example of normal radiation profiles (multiple irradiations)
Figure 13:
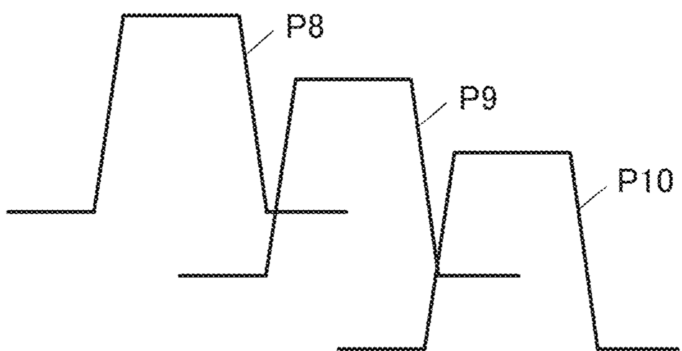
FIG. 13 is an example of abnormal radiation profiles (multiple irradiations)

FIG. 12 is an example of normal radiological profiles P5, P6, and P7 (multiple irradiations). On the other hand, FIG. 13 is an example of abnormal radiation profiles P8, P9, and P10 (a plurality of irradiations). In FIG. 12 and FIG. 13, the profiles are shifted from each other, but actually, the profiles are arranged in a state in which the lower limit values of the profiles are aligned.

In a case where the speed of the radiation source 11 is too high in the scan imaging, as illustrated in FIG. 13, the profiles do not overlap with each other, and cannot be combined.

When the dose of the radiation source 11 varies depending on the position in scan imaging, the profiles have different shapes and cannot be combined correctly.

If the radiation detector 2 has a problem (e.g., low detectability at a certain place), the shapes of the profiles are different and cannot be combined correctly. The faulty part occurs as unevenness.

Furthermore, as described above, in the scan imaging, it is necessary that the radiation profiles detected for the respective irradiation ranges ROI have the same shape and the radiation profiles overlap each other at a certain position. Under such circumstances, accuracy of the calibration image can be improved by increasing the overlapping portion of the radiation profiles.

Figure 14:
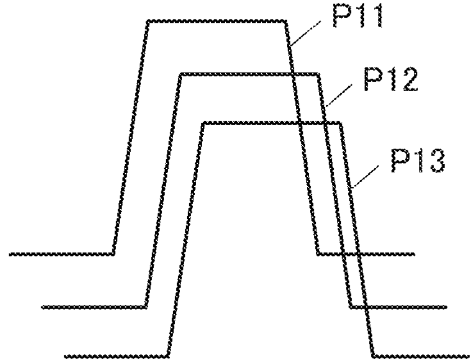
FIG. 14 is an example of high-precision radiation profiles (a plurality of irradiations).

Specifically, as illustrated in FIG. 14, a large overlapping portion is provided as compared with FIG. 12.

Further, the controller 31 may determine the imaging condition of the calibration imaging based on the patient information. In the imaging with a subject, the imaging conditions are divided into subject (large), subject (middle), and subject (small), and on the premise that the larger the physique, the higher the dose, in the calibration imaging as well, highly accurate measurement results are obtained by matching with the imaging conditions of the imaging with a subject. That is, when the imaging conditions of the calibration imaging and the imaging with the subject are the same, the accuracy is higher than that in a case where the calculation is performed later by conversion.

In addition, in steps S1, S11, S21, and S31 of FIG. 6 to FIG. 9, in a case where it is determined that the DXA imaging is performed, the controller 31 displays the DXA inspection screen on the display part 34, but at that time, an auto-positioning button for imaging without a subject may be displayed on the DXA inspection screen. When the auto-positioning button for imaging without a subject is pressed by the user, the radiation generating apparatus 1 moves to the home position for calibration imaging.

Thus, it is possible to reduce the time and effort of the user (engineer) and improve the efficiency of the workflow.

Others

Furthermore, a suppressing unit that suppresses a change in the state of the radiation generating apparatus 1 and/or the radiation detector 2 after the capturing of the calibration image may be provided. Specifically, the suppression means is means for suppressing attachment and detachment of the radiation detector 2 to and from the imaging stand S and change of the SID.

The suppression means is, for example, means for electromagnetically locking the radiation source 11 so that the distance cannot be changed in the SID direction so that the SID cannot be changed, after the capturing of the calibration image is completed. In this case, when the distance is changed in the SID direction, the user is necessary to intentionally perform an action (e.g., operation of the console 3) for releasing the electromagnetic lock. As another example, the suppression unit may be, for example, a unit that electromagnetically locks an insertion port for attaching and detaching the FPD so as to make it difficult to attach and detach the FPD to and from the bucky when the capturing of the calibration image is completed. In this case, when the FPD is attached or detached, the user needs to perform an action (for example, an operation of the console 3) for intentionally releasing the electromagnetic lock.

Note that in the first notification step and the second notification step, the controller 31 may cause the display part 34 to provide not only the notification that calibration imaging is necessary but also a notification that calibration imaging may be performed after DXA imaging (imaging with a subject).

Further, in the second notification step, the controller 31 may cause the display part 34 to perform the notification after prohibiting the subject-present imaging. Specifically, while the presence of the subject H can be confirmed by the detection device 5 included in the radiation imaging system 100, the controller 31 performs the notification after prohibiting the calibration imaging. Thus, it is possible to prevent the user from erroneously performing calibration imaging in a state where the subject H is on the imaging stand S.

In addition, in the flowcharts of FIG. 7 and FIG. 9, there are steps of determining the SID change and the attachment/detachment of the FPD, but the present invention is not limited thereto.

For example, it may be determined whether or not the angle information (+ panel angle) of the tube is appropriate. Although there may be a case where the tube is inclined depending on the state of the previous imaging, by doing so, it is possible to prevent the imaging from being started at an angle other than the predetermined angle, resulting in useless imaging.

In some cases, the controller 31 needs to control the tube voltage kV, the tube current, and the tube current-time product mAs value with higher accuracy than the specifications of the radiation generating apparatus 1. Therefore, the radiation source 11 is provided with a dosimeter or a means for transmitting dose information from the radiation generating apparatus 1 is used. The dose information may be input to the console 3 using the means, and the variation in the signal value on the image due to the variation in the dose may be corrected. Although the radiation generating apparatus 1 cannot perform irradiation with accuracy necessary in DXA imaging in many cases, an effect equivalent to irradiation with the same dose can be obtained in this manner. Note that as an alternative to the dosimeter, the dose information output by the radiation generating apparatus 1 may be used.

In addition, the controller 31 may derive a source skin distance (SSD; a distance from a tube focus to the surface of the subject H) by a visible light camera and/or a distance measuring sensor (distance measuring camera) attached to the tube (radiation source 11) or the collimator. For example, the controller 31 may subtract the SSD from the SID acquired from the mechanical arrangement information of the radiation generating apparatus 1 to obtain the body thickness and use the body thickness for scattered radiation correction (when the body thickness is large, it is necessary to increase the dose, and as a result, scattered radiation also increases, and therefore, more correction is necessary). Further, the SSD may be used for automatic derivation of the imaging condition.

Effects

As described above, the X-ray imaging system (the radiation imaging system 100) can appropriately perform an X-ray imaging system capable of performing X-ray imaging by dual-energy X-ray absorptiometry and general imaging, the X-ray imaging system comprising: an X-ray emitter (radiation generating apparatus 1) capable of individually emitting a plurality of X-rays having different energies; a portable X-ray detector (radiation detector 2) that captures an X-ray image based on the X-rays emitted by the X-ray emitter; and a hardware processor (console 3; particularly, controller 31) that provides a first notification regarding capturing of a calibration image by the X-ray detector under predetermined conditions, wherein the hardware processor provides the first notification each time X-ray imaging by dual-energy X-ray absorptiometry is performed or when it is determined that capturing of a calibration image is necessary, thereby suitably performing calibration in an X-ray imaging system capable of performing X-ray imaging by dual-energy X-ray absorptiometry and general imaging.

Furthermore, the X-ray imaging system (the radiation imaging system 100) includes the hardware processor (the controller 31) that determines whether it is necessary to capture a calibration image, and the hardware processor determines whether it is necessary to capture a calibration image on the basis of a change in the state of the X-ray emitter and/or the X-ray detector, thus allowing prevention of the state of the X-ray emitter and/or the X-ray detector from becoming unsuitable for imaging by the DXA method.

In addition, since the correlation between the capturing of the calibration image and the capturing of the subject image can be changed, in a case where the capturing of the image with a subject is performed first, the calibration image can be correlated again later.

In addition, the X-ray imaging system (the radiation imaging system 100) includes the hardware processor (the controller 31) that determines whether or not the subject is present on the imaging stand, and the hardware processor further performs the second notification in a case where the subject is present on the imaging stand at the time of capturing of the calibration image, and thus it is possible to prevent imaging in a state unsuitable for capturing of the calibration image.

Furthermore, the X-ray imaging control apparatus (the console 3) can appropriately perform an X-ray imaging control apparatus (console 3) in an X-ray imaging system that performs X-ray imaging by dual-energy X-ray absorptiometry and general imaging by an X-ray emitter (radiation generating apparatus 1) that can individually irradiate a plurality of X-rays having different energies and a portable X-ray detector (radiation detector 2) that captures an X-ray image based on the X-rays irradiated by the X-ray emitter, the X-ray imaging control apparatus comprising: a hardware processor that provides a first notification regarding capturing of a calibration image by the X-ray detector under a predetermined condition, wherein the hardware processor provides a notification each time X-ray imaging by dual-energy X-ray absorptiometry is performed or provides the first notification when it is determined that capturing of the calibration image is necessary, thereby enabling X-ray imaging by dual-energy X-ray absorptiometry and general imaging.

Furthermore, an X-ray imaging method using an X-ray imaging system (radiation imaging system 100) capable of performing X-ray imaging by dual-energy X-ray absorptiometry and general imaging by an X-ray emitter (radiation generating device 1) capable of individually emitting a plurality of X-rays having different energies and a portable X-ray detector (radiation detector 2) for imaging an X-ray image based on the X-rays emitted by the X-ray emitter, the X-ray imaging system comprising: a control step of providing a first notification regarding capturing of a calibration image by the X-ray detector under predetermined conditions, wherein the control step provides the notification each time X-ray imaging by dual-energy X-ray absorptiometry is performed or provides the first notification when it is determined that capturing of the calibration image is necessary, thereby, in an X-ray imaging system capable of performing X-ray imaging by dual-energy X-ray absorptiometry and general imaging, calibration can be suitably performed.

Furthermore, the program can suitably implement a computer of an X-ray imaging control apparatus (console 3) in an X-ray imaging system (radiation imaging system 100) which performs X-ray imaging by dual-energy X-ray absorptiometry and general imaging by an X-ray emitter (radiation generating apparatus 1) which can individually irradiate a plurality of X-rays having different energies and a portable X-ray detector (radiation detector 2) which captures an X-ray image based on the X-rays irradiated by the X-ray emitter, wherein the computer is caused to function as a hardware processor (controller 31) that provides a first notification regarding capturing of a calibration image by an X-ray detector under predetermined conditions, and the hardware processor provides the notification each time X-ray imaging by dual-energy X-ray absorptiometry is performed or provides the first notification when it is determined that capturing of the calibration image is necessary, thereby, in an X-ray imaging system capable of performing X-ray imaging by dual-energy X-ray absorptiometry and general imaging, calibration can be suitably performed.

Hereinabove, the present invention has been specifically described with reference to the embodiments, but the present invention is not limited to the above-described embodiments and can be modified without departing from the spirit and scope thereof.

For example, in the above embodiment, the console 3 has the function of executing the at-imaging process. However, another apparatus included in the radiation imaging system 100 or another system connected to the radiation imaging system 100 may have a function of executing the processing at the time of imaging or a function of executing a part of the processing at the time of imaging.

In addition, although the X-ray imaging system capable of performing X-ray imaging by the dual-energy X-ray absorptiometry and general imaging has been described above, an imaging function other than these two imaging functions may be mounted. Furthermore, for example, the imaging apparatus may be a DXA imaging apparatus implemented by a fluoroscopy apparatus.

Further, in the above description, an example in which a semiconductor memory or a hard disk is used as a computer-readable medium of the program according to the present invention has been disclosed, but the present invention is not limited to this example.

As other computer-readable media, a nonvolatile memory such as a flash memory and a portable recording medium such as a CD-ROM can be applied.

As a medium for providing data of the program according to the present invention via a communication line, a carrier wave is also applied to the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An X-ray imaging system capable of performing X-ray imaging by dual-energy X-ray absorptiometry and general imaging, the X-ray imaging system comprising:

an X-ray emitter capable of individually emitting a plurality of X-rays having different energies;

a portable X-ray detector that captures an X-ray image based on an X-ray emitted by the X-ray emitter; and a hardware processor that provides, under a predetermined condition, a first notification related to capturing of a calibration image by the X-ray detector, wherein the hardware processor determines whether X-ray imaging to be performed is X-ray imaging by the dual-energy X-ray absorptiometry or general imaging, and the hardware processor provides the first notification under the predetermined condition when the X-ray imaging to be performed is X-ray imaging by the dual-energy X-ray absorptiometry.

2. The X-ray imaging system according to claim 1, wherein the calibration image is an image captured by the X-ray detector in a state in which no subject is present between the X-ray emitter and the X-ray detector.

3. The X-ray imaging system according to claim 1, wherein the hardware processor further determines whether or not capturing of the calibration image is necessary, based on a change in a state of the X-ray emitter and/or the X-ray detector.

4. The X-ray imaging system according to claim 3, wherein the change in the state is a change in a period from previous capturing of the calibration image to capturing of a subject image.

5. The X-ray imaging system according to claim 3, wherein the change in the state is a change in a distance between the X-ray emitter and the X-ray detector.

6. The X-ray imaging system according to claim 3, wherein the change in the state is attachment or detachment of the X-ray detector to or from an imaging stand.

7. The X-ray imaging system according to claim 3, wherein, when the hardware processor determines that capturing of the calibration image is not necessary, the hardware processor does not provide the first notification.

8. The X-ray imaging system according to claim 1, wherein an association between capturing of the calibration image and capturing of a subject image is changeable.

9. The X-ray imaging system according to claim 1, wherein the hardware processor causes a notifier provided in an X-ray imaging controller that controls X-ray imaging and/or an imaging stand to execute the first notification.

10. The X-ray imaging system according to claim 1, wherein the hardware processor determines whether a subject is present on an imaging stand, and the hardware processor further provides a second notification that the subject is present on the imaging stand when the subject is present on the imaging stand at a time of capturing the calibration image.

11. The X-ray imaging system according to claim 10, wherein the hardware processor determines whether the subject is present on the imaging stand using at least one of a camera, a gravity sensor, a captured image, and a laser.

12. The X-ray imaging system according to claim 10, wherein, when the subject is present on the imaging stand at the time of capturing the calibration image, the hardware processor provides, in the second notification, a notification that the calibration image may be captured after a subject image is captured.

13. The X-ray imaging system according to claim 1, wherein the predetermined condition is each time X-ray imaging by the dual-energy X-ray absorptiometry is performed or when capturing of the calibration image is determined to be necessary.

14. An X-ray imaging control apparatus in an X-ray imaging system that performs X-ray imaging by dual-energy X-ray absorptiometry and general imaging by using an X-ray emitter capable of individually emitting a plurality of X-rays having different energies and a portable X-ray detector that captures an X-ray image based on an X-ray emitted by the X-ray emitter, the X-ray imaging control apparatus comprising a hardware processor that provides a first notification related to capturing of a calibration image by the X-ray detector under a predetermined condition, wherein the hardware processor determines whether X-ray imaging to be performed is X-ray imaging by the dual-energy X-ray absorptiometry or general imaging, and the hardware processor provides the first notification under the predetermined condition when the X-ray imaging to be performed is X-ray imaging by the dual-energy X-ray absorptiometry.

15. An X-ray imaging method using an X-ray imaging system capable of performing X-ray imaging by dual-energy X-ray absorptiometry and general imaging by an X-ray emitter capable of individually emitting a plurality of X-rays having different energies and a portable X-ray detector that captures an X-ray image based on an X-ray emitted by the X-ray emitter, the X-ray imaging method comprising determining whether X-ray imaging to be performed is X-ray imaging by the dual-energy X-ray absorptiometry or general imaging, and providing, under a predetermined condition, a first notification related to capturing of a calibration image by the X-ray detector, wherein when the X-ray imaging to be performed is X-ray imaging by the dual-energy X-ray absorptiometry.

16. An X-ray imaging system capable of performing X-ray imaging by dual-energy X-ray absorptiometry and general imaging, the X-ray imaging system comprising:

an X-ray emitter capable of individually emitting a plurality of X-rays having different energies;

a portable X-ray detector that captures an X-ray image based on an X-ray emitted by the X-ray emitter; and a hardware processor determines whether X-ray imaging to be performed is X-ray imaging by the dual-energy X-ray absorptiometry or general imaging, wherein the hardware processor determines whether or not capturing of the calibration image is necessary when the X-ray imaging to be performed is X-ray imaging by the dual-energy X-ray absorptiometry.

17. The X-ray imaging system according to claim 16, wherein, when the hardware processor determines that capturing of the calibration image is necessary, the hardware processor provides a notification.

18. An X-ray imaging control apparatus in an X-ray imaging system that performs X-ray imaging by dual-energy X-ray absorptiometry and general imaging by using an X-ray emitter capable of individually emitting a plurality of X-rays having different energies and a portable X-ray detector that captures an X-ray image based on an X-ray emitted by the X-ray emitter, the X-ray imaging control apparatus comprising a hardware processor that determines whether X-ray imaging to be performed is X-ray imaging by the dual-energy X-ray absorptiometry or general imaging, wherein the hardware processor that determines whether or not capturing of the calibration image is necessary when the X-ray imaging to be performed is X-ray imaging by the dual-energy X-ray absorptiometry.

19. An X-ray imaging method using an X-ray imaging system capable of performing X-ray imaging by dual-energy X-ray absorptiometry and general imaging by an X-ray emitter capable of individually emitting a plurality of X-rays having different energies and a portable X-ray detector that captures an X-ray image based on an X-ray emitted by the X-ray emitter, the X-ray imaging method comprising determining whether X-ray imaging to be performed is X-ray imaging by the dual-energy X-ray absorptiometry or general imaging, and determining whether or not capturing of the calibration image is necessary when the X-ray imaging to be performed is X-ray imaging by the dual-energy X-ray absorptiometry.

* * * * *